US012774435B2

(12) United States Patent
Dabove et al.

(10) Patent No.: US 12,774,435 B2
(45) Date of Patent: Oct. 27, 2026

(54) HARD SURFACE CLEANER AND BIOCIDE DELIVERY SYSTEM

(71) Applicant: DIZOLVE GROUP CORPORATION, Moncton (CA)

(72) Inventors: Daniel A.C. Dabove, Moncton (CA); Ala'a Al-Faraj, Riverview (CA); Michel Robichaud, Fundy National Park (CA)

(73) Assignee: Dizolve Group Corporation, Moncton (CA)

( * ) Notice: Subject to any disclaimer, the term of this patent is extended or adjusted under 35 U.S.C. 154(b) by 508 days.

(21) Appl. No.: 18/267,367

(22) PCT Filed: Dec. 14, 2021

(86) PCT No.: PCT/CA2021/000107
§ 371 (c)(1),
(2) Date: Jun. 14, 2023

(87) PCT Pub. No.: WO2022/126232
PCT Pub. Date: Jun. 23, 2022

(65) Prior Publication Data

US 2024/0052277 A1 Feb. 15, 2024

(30) Foreign Application Priority Data

Dec. 15, 2020 (CA) ..................................... 3102741

(51) Int. Cl.
*C11D 1/02* (2006.01)
*C11D 1/62* (2006.01)
(Continued)

(52) U.S. Cl.
CPC ................ *C11D 17/06* (2013.01); *C11D 1/75* (2013.01); *C11D 1/825* (2013.01); *C11D 3/2065* (2013.01);
(Continued)

(58) Field of Classification Search
CPC .... C11D 1/02; C11D 1/62; C11D 1/66; C11D 1/90; C11D 3/2065; C11D 3/22;
(Continued)

(56) References Cited

U.S. PATENT DOCUMENTS 2,112,963 A 4/1938 Jones
2,221,019 A 11/1940 Clarke
(Continued)

FOREIGN PATENT DOCUMENTS

CA 2695068 A1 9/2010
CA 3035979 A1 3/2018
(Continued)

OTHER PUBLICATIONS

International Searching Authority, "International Search Report and Written Opinion," issued in connection with International Application No. PCT/CA2021/000107, dated May 9, 2022, 9 pages.

*Primary Examiner* — Brian P Mruk
(74) *Attorney, Agent, or Firm* — Nyemaster Goode P.C.

(57) ABSTRACT

A water-soluble sheet for delivering a cationic biocide composition, such as benzalkonium chloride, to a volume of water for use as a hard surface cleaner or disinfectant.

20 Claims, 1 Drawing Sheet

(51) Int. Cl.

| | |
|---|---|
| ***C11D 1/66*** | (2006.01) |
| ***C11D 1/75*** | (2006.01) |
| ***C11D 1/825*** | (2006.01) |
| ***C11D 1/90*** | (2006.01) |
| ***C11D 3/20*** | (2006.01) |
| ***C11D 3/22*** | (2006.01) |
| ***C11D 3/30*** | (2006.01) |
| ***C11D 3/37*** | (2006.01) |
| ***C11D 3/40*** | (2006.01) |
| ***C11D 3/48*** | (2006.01) |
| ***C11D 3/50*** | (2006.01) |
| ***C11D 17/06*** | (2006.01) |
| ***D06M 15/11*** | (2006.01) |
| ***D06M 15/21*** | (2006.01) |
| ***D06M 17/06*** | (2006.01) |

(52) U.S. Cl.

CPC ................ *C11D 3/222* (2013.01); *C11D 3/30* (2013.01); *C11D 3/3753* (2013.01); *C11D 3/40* (2013.01); *C11D 3/48* (2013.01); *C11D 3/50* (2013.01)

(58) Field of Classification Search

CPC .. C11D 3/222; C11D 3/40; C11D 3/48; C11D 3/50; C11D 3/3753; C11D 17/041; C11D 17/06; D06M 15/11; D06M 15/21; D06M 17/06

See application file for complete search history.

(56) References Cited

U.S. PATENT DOCUMENTS

| | | | |
|---|---|---|---|
| 2,665,528 | A | 1/1954 | Sternfield et al. |
| 3,694,364 | A | 9/1972 | Edwards |
| 3,737,509 | A | 6/1973 | Kobayashi et al. |
| 3,904,543 | A | 9/1975 | Knighten |
| 3,950,277 | A | 4/1976 | Stewart et al. |
| 4,473,523 | A | 9/1984 | Sasaki et al. |
| 4,853,142 | A | 8/1989 | Win et al. |
| 4,930,565 | A | 6/1990 | Hackman et al. |
| 4,938,888 | A | 7/1990 | Kiefer et al. |
| 5,264,269 | A | 11/1993 | Kakiuchi et al. |
| 5,574,179 | A | 11/1996 | Siklosi et al. |
| 5,863,887 | A | 1/1999 | Gillette |
| 6,416,580 | B1 | 7/2002 | Kohl et al. |
| 6,818,606 | B1 | 11/2004 | Hanada et al. |
| 6,864,196 | B2 | 3/2005 | Graham et al. |
| 6,949,498 | B2 | 9/2005 | Murphy et al. |
| 7,094,744 | B1 | 8/2006 | Kobayashi et al. |
| 7,101,456 | B2 | 9/2006 | Bunyard et al. |
| 7,198,888 | B2 | 4/2007 | Endo et al. |
| 7,378,360 | B2 | 5/2008 | Clark et al. |
| 7,544,409 | B2 | 6/2009 | Copland et al. |
| 7,981,249 | B2 | 7/2011 | Agarwal |
| 9,464,264 | B2 | 10/2016 | Jalbert et al. |
| 10,639,825 | B2 | 5/2020 | Jalbert et al. |
| 10,717,954 | B2 | 7/2020 | Astete Boettcher |
| 10,869,479 | B2 | 12/2020 | Burke et al. |
| 10,925,443 | B2 | 2/2021 | Izumi et al. |
| 2001/0008119 | A1 | 7/2001 | Wight |
| 2002/0000290 | A1 | 1/2002 | Crump et al. |
| 2003/0116095 | A1 | 6/2003 | Otsuji |
| 2004/0046272 | A1 | 3/2004 | Arai et al. |
| 2005/0037942 | A1 | 2/2005 | Otterson et al. |
| 2006/0081176 | A1 | 4/2006 | Boyle et al. |
| 2007/0178055 | A1 | 8/2007 | Buch et al. |
| 2007/0202315 | A1 | 8/2007 | Duffield et al. |
| 2008/0014393 | A1 | 1/2008 | Denome et al. |
| 2008/0064618 | A1 | 3/2008 | Bastigkeit et al. |
| 2009/0291282 | A1 | 11/2009 | Kitamura et al. |
| 2010/0291165 | A1 | 11/2010 | Glenn, Jr. et al. |
| 2011/0002820 | A1 | 1/2011 | Dawson et al. |
| 2011/0028374 | A1 | 2/2011 | Fossum et al. |
| 2011/0136719 | A1 | 6/2011 | Jalbert et al. |
| 2012/0207699 | A1 | 8/2012 | Mchatton et al. |
| 2014/0023741 | A1 | 1/2014 | Grassi |
| 2018/0146834 | A1 | 5/2018 | Izumi et al. |
| 2019/0053495 | A1 | 2/2019 | Smyth et al. |
| 2019/0223680 | A1 | 7/2019 | Yamazaki |
| 2019/0246863 | A1 | 8/2019 | Mukoyama |
| 2020/0139002 | A1 | 5/2020 | Dudnyk et al. |
| 2020/0308453 | A1 | 10/2020 | Kishimoto et al. |
| 2021/0238509 | A1 | 8/2021 | Janssen et al. |
| 2021/0261892 | A1 | 8/2021 | Xu et al. |

FOREIGN PATENT DOCUMENTS

| | | | | |
|---|---|---|---|---|
| EP | 2226379 | A1 | 9/2010 | |
| WO | 2004087857 | A1 | 10/2004 | |
| WO | 2006134657 | A1 | 12/2006 | |
| WO | 2007034471 | A2 | 3/2007 | |
| WO | 2020079177 | A1 | 4/2020 | |
| WO | WO 2020/079177 | * | 4/2020 | ............. C11D 11/00 |
| WO | 2020210894 | A1 | 10/2020 | |

* cited by examiner

HARD SURFACE CLEANER AND BIOCIDE DELIVERY SYSTEM

CROSS-REFERENCE TO RELATED APPLICATIONS

This application is a National Stage Entry of International Patent Application No. PCT/CA2021/000107, filed on Dec. 14, 2021, entitled HARD SURFACE CLEANER AND BIOCIDE DELIVERY SYSTEM, which claims priority to Canadian Application No. 3,102,741, filed Dec. 15, 2020, entitled HARD SURFACE CLEANER AND BIOCIDE DELIVERY SYSTEM. Each of these prior applications are incorporated herein by reference in their entirety and for all purposes.

FIELD OF THE INVENTION

The present invention relates to the field of cleaners and biocides. More particularly, the present invention relates to systems and methods for delivering a biocide in the form of a premeasured dose sufficient for one or more disinfection or cleaning operations.

BACKGROUND OF THE INVENTION

Biocides and/or cleaners for use on hard surfaces are commonly provided in liquid form. This liquid form has a number of drawbacks. For example, liquids can be messy and inconvenient to handle. Also, due to toxicity, such a liquid must be stored and handled carefully to avoid harm. Furthermore, such liquid can be difficult to transport. A person travelling may find it difficult to transport such liquids due to flight safety regulations.

Various attempts to deliver a cleaning active to a volume of water in the form of a water-soluble sheet are known in the art. By way of example, dissolvable laundry detergent sheets have been disclosed in U.S. Pat. Nos. 3,904,543, 5,863,887, 6,864,196, 6,818,606, 7,094,744, 9,464,264, 10,639,825, and 10,717,954; U.S. patent application publication Nos. 2009/0291282, 2011/0136719; PCT International patent application publication Nos. WO2004/087857, WO 2006/134657, WO2007/034471; Canadian patent application Nos. 2,695,068, and 3,035,979; and European patent application No. 2,226,379.

Other prior art patent publications of general interest to the topic of delivering a cleaning active include U.S. Pat. Nos. 2,221,019, 2,112,963, 2,665,528, 3,694,364, 3,737,509, 3,950,277, 4,473,523, 4,853,142, 4,930,565, 4,938,888, 5,574,179, 6,416,580, 6,864,196, 6,949,498, 7,544,409, and U.S. Pat. App. Pub. Nos. 2001/0008119, 2002/0000290, 2004/0046272, 2005/0037942, 2006/0081176, 2008/0014393; U.S. Pat. App. Pub. No. 2008/0064618, 2009/0291282, 2010/291165, 2011/0028374, 2011/0136719, 2012/0207699, 2014/0023741.

Biocides, including the quaternary ammonium compound benzalkonium chloride, are also known in the art. However, even in view of the state of the art, reliably making a water-soluble sheet containing a biocide, such as benzalkonium chloride, which has a consistent appearance, a pleasant texture and feel, when dry, and yet readily dissolves in water to release the biocide and other cleaning actives, is not straightforward. The choice of chemical ingredients and their concentrations is limitless and there is significant potential for deleterious and unforeseen interactions and reactions between the chemical components.

That said, there are a few notable examples of prior art attempts at providing benzalkonium chloride to treat surfaces. For example, U.S. Pat. App. Pub. No. 2011/0002820 to Dawson disclosed an exterior surface treatment system for treating surfaces in the open air subject to weathering includes a container. The container is formed of a water-soluble material and defines an interior. The system includes a composition located in the interior, the composition including one or more biocides, the total proportion of the biocide or biocides in the composition being greater than 40% w/w. Dawson disclosed that the biocide may be a quaternary ammonium compound selected from benzalkonium chloride and dodecyl dimethyl ammonium chloride. However, a problem with the Dawson system is that it requires a container, which is bulky and lacks all of the benefits noted above relating to dissolvable sheets.

U.S. Pat. App. Pub. No. 2021/0238509 to Janssen (also published under PCT Pat. App. No. WO2020/079177) disclosed a method for manufacturing a water-soluble laundry detergent sheet from a liquid composition including the following components: (a) at least one textile stiffening agent, (b) at least one surfactant, (c) at least one water-soluble polymer, (d) at least one cellulase, (e) optionally at least one perfume component, and (f) optionally at least one adjunct detergent ingredient. Janssen contemplates benzalkonium chloride as being a suitable example of one of several quaternary ammonium compounds which may be comprised by the at least one surfactant. However, Janssen's laundry detergent sheets are not well suited for cleaning or disinfecting hard surfaces, and in any event Janssen does not disclose or suggest such an application for its laundry detergent sheets.

Other prior art patent publications of general interest to the topic of biocides include U.S. Pat. Nos. 5,264,269; 7,101,456, 7; 198,888, 7,378,360; 7,981,249, 10,717,954; 10,869,479, and 10,925,443; and U.S. Pat. App. Pub. Nos. U.S. 2003/0116095, 2007/0178055, 2007/0202315, 2018/0146834, 2019/0053495; 2019/0223680, 2019/0246863, 2020/0139002, 2020/0308453, and 2021/0261892.

Accordingly, there is a need for improvements in the field of cleaners and biocides, and in particular water-soluble sheets suitable for delivering a biocide to a hard surface.

SUMMARY OF THE INVENTION

What is desired is an improved system and method for delivering a hard surface cleaning composition having a biocide to where it is needed, that overcomes at least some of the problems in the prior art. For example, what may be desired is a system and method for delivering a biocide and/or hard surface cleaning composition in the form of a premeasured unit dose sufficient for a single disinfecting, cleaning or treatment operation. As yet another example, what may be desired is a carrier for delivering a biocide and/or hard surface cleaning composition in the form of a sheet that is easy to handle and store when dry, yet which dissolves completely when contacted by water, to deliver the biocide and/or hard surface cleaning composition, without leaving behind any substrate or noticeable residue.

According to an aspect of the invention, there is provided a carrier for delivering a biocide composition, the carrier comprising a water-soluble sheet, the water-soluble sheet comprising:

about 14.5 weight % to about 18 weight %, of a biodegradable supporting matrix, such as polyvinyl alcohol (PVA), preferably a combination of PVA BP-05 and PVA BP-17 (available from Chang Chun Petrochemical Co., Ltd., Taipei, Taiwan);

about 2.7 weight % to about 3.3 weight %, of a biocide, such as benzalkonium chloride;

about 6 weight % to about 7.5 weighty, of a texture improver, such as glycerin;

about 38 weight % to about 46 weight %, of a plant-derived biodegradability booster, such as starch;

about 17.0 weight % to about 21 weight % surfactant/detergent ingredients, comprising one or more of lauramine oxide and cocamidopropyl betaine;

about 7.8 weight % to about 8.2 weight %, of water to provide a water content of about 8 percent.

There is also provided a method for making this carrier, comprising the steps of:

mixing a first concentrated stock solution comprising

| Ingredients | Function | Wt % |
|---|---|---|
| polyvinyl alcohol (PVA) BP-05 | biodegradable supporting matrix | 1.98% |
| polyvinyl alcohol (PVA) BP-17 | biodegradable supporting matrix | 17.81% |
| potassium sorbate | food-grade preservative | 0.05% |
| glycerin | improve texture of sheets | 4.95% |
| water | | 75.21% |

mixing a second concentrated stock solution comprising

| Ingredients | Function | Wt % |
|---|---|---|
| lauramine oxide | amphoteric secondary surfactant with high foaming power | 40.00% |
| cocamidopropyl betaine | amphoteric surfactant, thickener and foam booster co-surfactant | 40.00% |
| potassium sorbate | food-grade preservative | 1.00% |
| water | | 19.00% |

creating a final mixture comprising

| Ingredients | Function | Wt % |
|---|---|---|
| the first concentrated stock solution | | 40.81% |
| starch powder | plant-derived biodegradability booster | 20.40% |
| the second concentrated stock solution | | 34.0% |
| benzalkonium chloride | cationic surfactant used as biocide | 1.77% |
| mineral oil | improve texture of sheets | 1.63% |
| food colour (optional) | colour agent | 0.10% |
| fragrance (optional) | fragrance | 0.07% |
| glycerin | improve texture of sheets | 1.22% |

wherein the first concentrated stock solution is preferably mixed first with the starch powder for 1 minute, then the second concentrated stock solution is added to the mixture, followed by the benzalkoniuni chloride, the mineral oil and the glycerin, to create the final mixture;

mixing the final mixture for 30-60 minutes;

applying the final mixture to a surface;

drying the final mixture into a flat sheet; and cutting the flat sheet into single use water soluble sheets.

According to another aspect of the invention, there is provided a carrier for delivering a biocide composition, the carrier comprising a water-soluble sheet, the water soluble sheet comprising:

about 16.5 weight % to about 20.5 weight %, of a biodegradable supporting matrix, such as PVA, preferably a combination of PVA BP-05 and PVA BP-17 (available from Chang Chun Petrochemical Co., Ltd., Taipei, Taiwan);

about 24.6 weight % to about 30.1 weight %, of a biocide, such as benzalkonium chloride;

about 6.3 weight % to about 7.7 weight %, of a texture improver, such as glycerin;

about 28 weight % to about 34 weight %, of a plant-derived biodegradability booster, such as starch;

about 18.0 weight % to about 22 weight % surfactant/detergent ingredients, comprising one or more of lauramine oxide, cocamidopropyl betaine, polyalkyl glucoside and glycereth cocoate;

about 7.8 weight % to about 8.2 weight %, of water to provide a water content of about 8 percent.

There is also provided a method for making this carrier, comprising the steps of:

mixing a first concentrated stock solution comprising

| Ingredients | Function | Wt % |
|---|---|---|
| polyvinyl alcohol (PVA) BP-05 | biodegradable supporting matrix | 1.98% |
| polyvinyl alcohol (PVA) BP-17 | biodegradable supporting matrix | 17.81% |
| potassium sorbate | food-grade preservative | 0.05% |
| glycerin | improve texture of sheets | 4.95% |
| water | | 75.21% |

mixing a second concentrated stock solution comprising

| Ingredients | Function | Wt % |
|---|---|---|
| lauramine oxide | amphoteric secondary surfactant with high foaming power | 11.50% |
| cocamidopropyl betaine | amphoteric surfactant thickener and foam booster co-surfactant | 11.00% |
| alkyl polyglucosides | surfactant | 8.50% |
| glycereth cocoate | non-ionic surfactant | 15.00% |
| sodium gluconate | food-grade preservative | 2.50% |
| potassium sorbate | food-grade preservative | 1.50% |
| water | | 50.00% |

creating a final mixture comprising

| Ingredients | Function | Wt % |
|---|---|---|
| first concentrated stock solution | | 55.23% |
| starch powder | plant-derived biodegradability booster | 17.95% |

-continued

| Ingredients | Function | Wt % |
|---|---|---|
| second concentrated stock solution | | 5.52% |
| benzalkonium chloride | cationic surfactant used as biocide | 17.95% |
| mineral oil | improve texture of sheets | 1.93% |
| fragrance (optional) | scent | 0.18% |
| glycerin | improve texture of sheets | 1.24% |

wherein the first concentrated stock solution is preferably mixed first with the starch powder for 1 minute, then the second concentrated stock solution is added to the mixture, followed by the benzalkonium chloride, the mineral oil and the glycerin, to create the final mixture;

mixing the final mixture for 30-60 minutes;

applying the final mixture to a surface;

drying the final mixture into a flat sheet;

cutting the flat sheet into single use water soluble sheets.

According to another aspect of the invention, there is provided a carrier for delivering a biocide composition, the carrier comprising a water-soluble sheet, the water soluble sheet comprising:

about 25 weight % to about 35 weight %, of a biodegradable supporting matrix, such as PVA, preferably a combination of PVA BP-05 and PVA BP-17 (available from Chang Chun Petrochemical Co., Ltd., Taipei, Taiwan);

about 0.1 weight % to about 1 weight %, of a food-grade preservative, which may comprise one or more of sodium gluconate and potassium sorbate;

about 0.1 weight % to about 6 weight %, of a biocide, such as benzalkonium chloride;

about 3 weight % to about 7 weight %, of a texture improver, such as glycerin;

about 0.1 weight % to about 1 weight %, of a fragrance to provide scent enhancement;

about 10 weight % to about 15 weight %, of an anionic surfactant such alpha olefin sulfonate about 0.01 weight % to about 0.2 weight % of food colouring; and about 5 weight % to about 15 weight % surfactant/detergent ingredients, comprising one or more of lauramine oxide, cocamidopropyl betaine, polyalkyl glucoside and glycereth cocoate.

There is also provided a method for making this carrier, comprising the steps of:

mixing a first concentrated stock solution comprising

| Ingredients | Function | Wt % |
|---|---|---|
| polyvinyl alcohol (PVA) BP-05 | biodegradable supporting matrix | 1.98% |
| polyvinyl alcohol PVA) BP-17 | biodegradable supporting matrix | 17.81% |

-continued

| Ingredients | Function | Wt % |
|---|---|---|
| potassium sorbate | food-grade preservative | 0.05% |
| glycerin | improve texture of sheets | 4.95% |
| water | | 75.21% |

mixing a second concentrated stock solution comprising

| Ingredients | Function | Wt % |
|---|---|---|
| alpha olefin sulfonate | anionic surfactant | 40% |
| alkyl polyglucosides | surfactant | 11% |
| sodium gluconate | food-grade preservative | 2.50% |
| potassium sorbate | food-grade preservative | 1.50% |
| water | | 45.00% |

creating a final mixture comprising

| Ingredients | Function | Wt % |
|---|---|---|
| first concentrated stock solution | | 72.33% |
| carboxymethyl cellulose | water dissolvable polymer | 1.81% |
| second concentrated stock solution | | 21.70% |
| benzalkonium chloride | cationic surfactant used as biocide | 1.81% |
| mineral oil | improve texture of sheets | 0.72% |
| fragrance (optional) | scent | 0.00% |
| dye (optional) | yellow food color | 0.00% |
| glycerin | improve texture of sheets | 1.63% |

wherein the second concentrated stock solution is preferably added to the first concentrated stock solution, followed by the benzalkonium chloride, the glycerin, and optionally the fragrance and dye, to create the final mixture;

mixing the final mixture for 45 minutes to a viscosity of 40,000 cp at 20° C.; applying the final mixture to a surface;

drying the final mixture into a flat sheet;

cutting the flat sheet into single use water soluble sheets.

According to another aspect of the present invention, the carrier may be used in a method of killing harmful organisms positioned on a hard surface with a mop, cloth, sponge, or hand pump trigger sprayer.

According to another aspect of the present invention, instructions may be provided to guide a user on how to dissolve the carrier in a volume of water to result in concentration of biocide and/or cleaner in accordance with manufacturer's recommendations. The process may comprise of wiping the harmful organism from a substrate after contacting them with the premeasured aqueous composition held by the water and the dissolvable sheet. The effective period of time may be in the range from about 1 to about 20 minutes.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

At the outset, it is noted that the term "biocide" as used herein refers to a diverse group of poisonous substances including preservatives, insecticides, disinfectants, and pesticides used for the control of organisms that are harmful to human or animal health or that cause damage to natural or manufactured products. In this regard, the term "harmful organisms" as used herein refers to bacteria, viruses, spores and fungi. The term "microorganism" as used herein refers to bacteria, fungi, viruses, and bacterial spores.

The term "antimicrobial agent" as used herein refers to any agent that kills or suppresses the growth of microorganisms.

The term "disinfectant" as used herein refers to a chemical agent that destroys disease-causing pathogens or other harmful microorganisms, but might not kill bacterial spores.

The term "hard surface" as used herein refers to any hard and non-porous surface.

Figure 1:
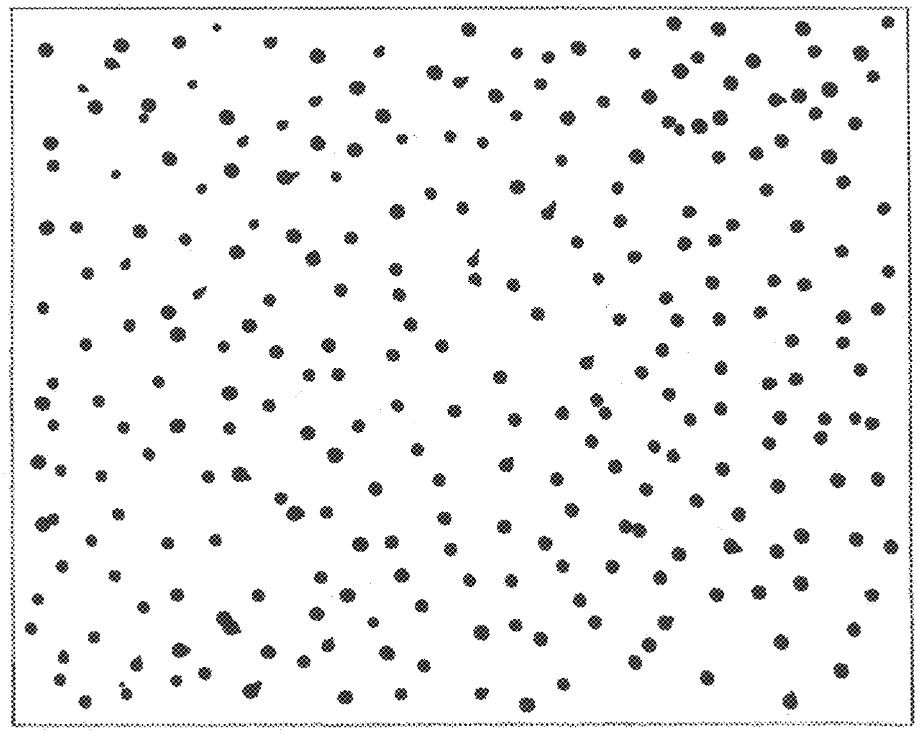
FIG. 1 is a top view of an active composition delivery system in the form of a hard surface cleaning and disinfecting sheet, according to an embodiment of the present invention.
Figure 2:
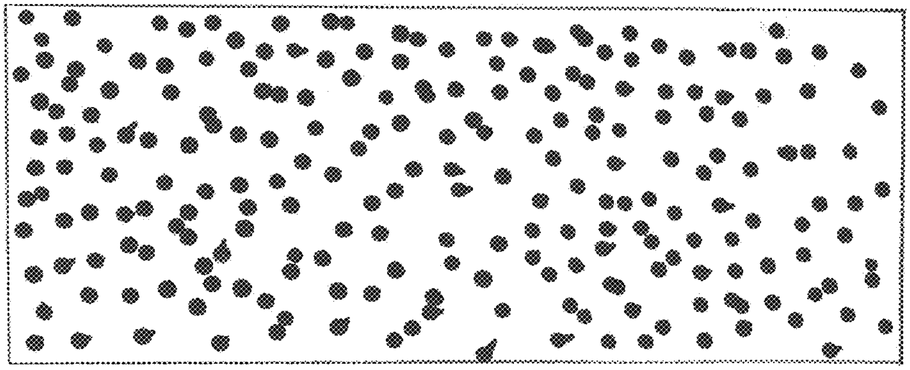
FIG. 2 is a top view of an active composition delivery system in the form of a hard surface cleaning and disinfecting sheet, according to another embodiment of the present invention.

An active composition delivery system 10 for delivering a biocide and/or hard surface cleaner, according to an embodiment of the present invention, is shown in FIG. 1, Preferably, the system 10 has a water-soluble substrate 12, and an active composition 14 disposed uniformly throughout the water-soluble substrate 12. Most preferably, the active composition is a biocide and/or hard surface cleaner which is also water soluble. The water-soluble substrate 12 is preferably sized and shaped to form a sheet, and hold a premeasured amount of the active composition 14. The water-soluble substrate 12 is configured to dissolve when contacted with a sufficient amount of water, thereby releasing the active composition 14 into the water. According to the example shown in FIG. 1, the active composition delivery system 10 may be sized and shaped to form a square sheet, which is for example 5 inches long by 4 inches wide and which is for example 0.9 mm thick. It will of course be appreciated that other dimensions may be suitable depending on the application, or the amount of active composition 14 required or desired to be stored in and delivered by the active composition delivery system 10. Accordingly, it is contemplated that the active composition delivery system 10 may be shaped as a rectangle, or any other polygon, including triangle, trapezoid, diamond, rhombus, parallelogram, and the like, as well as arcuate shapes, such as circles, ovals and the like, and combinations thereof. Furthermore, the dimensions of the length and width may be larger or smaller than 4 or 5 inches, and the thickness may be larger or smaller than 0.7 mm. As another example, FIG. 2 shows the active composition delivery system 10 in a larger rectangular form which is five inches long and two inches wide and 0.9 mm thick.

Having described an embodiment of the active composition delivery system 10 of the present invention, method for making the same are described next in Examples 1 and 2.

Example 1 describes a method of making a water-soluble sheet for use as a hard surface cleaner with biocide, primarily for in-home or consumer use, according to an embodiment of the present invention.

Preferably, this example water-soluble sheet for a hard surface cleaner with biocide may contain the following compounds:

- about 14.5 weight % to about 18 weight %, of a biodegradable supporting matrix; such as polyvinyl alcohol (PVA), preferably a combination of PVA BP-05 and PVA BP-17 (available from Chang Chun Petrochemical Co., Ltd., Taipei, Taiwan);
- about 0.68 weight % to about 0.84 weight %, of a food-grade preservative, such as potassium sorbate;
- about 2.7 weight % to about 3.3 weight %, of a biocide, such as benzalkonium chloride;
- about 6 weight % to about 7.5 weight %, of a texture improver, such as glycerin;
- optionally about 0.12 weight % to about 0.16 weight %, of a fragrance to provide scent enhancement;
- about 38 weight % to about 46 weight %, of a plant-derived biodegradability booster, such as starch;
- about 0.18 weight % to about 0.22 weight % food colouring;
- about 17.0 weight % to about 21 weight % surfactant/detergent ingredients, comprising one or more of lauramine oxide and cocamidopropyl betaine;
- about 3.0 weight % to about 3.75 weight %, of a texture improver, such as mineral oil; and
- about 7.8 weight % to about 8.2 weight %, of water to provide a water content of about 8 percent.

Example 2 describes a method of making a water-soluble sheet for use as a hard surface cleaner with biocide, primarily for industrial or commercial use, according to an embodiment of the present invention.

Preferably, this example water-soluble sheet may contain the following compounds:

- about 16.5 weight % to about 20.5 weight %, of a biodegradable supporting matrix, such as PVA, preferably a combination of PVA BP-05 and PVA BP-17 (available from Chang Chun Petrochemical Co., Ltd., Taipei, Taiwan);
- about 0.4 weight % to about 0.5 weight %, of a food-grade preservative, which may comprise one or more of sodium gluconate and potassium sorbate;
- about 24.6 weight % to about 30.1 weight %, of a biocide, such as benzalkonium chloride;
- about 6.3 weight % to about 7.7 weight %, of a texture improver, such as glycerin;
- about 0.11 weight % to about 0.13 weight %, of a fragrance to provide scent enhancement;
- about 28 weight % to about 34 weight %, of a plant-derived biodegradability booster, such as starch;
- about 0.15 weight % to about 0.19 weight % food colouring;

about 18.0 weight % to about 22 weight % surfactant/detergent ingredients, comprising one or more of lauramine oxide, cocamidopropyl betaine, polyalkyl glucoside and glycereth cocoate;

about 3.0 weight % to about 3.75 weight %, of a texture improver, such as mineral oil; and about 7.8 weight % to about 8.2 weight %, of water to provide a water content of about 8 percent.

Water Soluble Polymers

The polyvinyl alcohol (PVA) and the starch which are referenced in the above Examples 1 and 2 are water-soluble polymers used to form the water-soluble sheet containing the remaining compounds. As such, the role of the water-soluble polymers is to function in the resulting water-soluble sheet as film-former, a structurant, and as well as a carrier for other active ingredients.

Suitable water-soluble polymers consist of average molecular weights ranging from about 20,000 to about 100,000 Daltons, more preferably from about 25,000 to 80,000 Daltons.

PVA may be characterized by a degree of hydrolysis ranging from about 70% to about 100%, preferably from about 80% to about 95%. Polyvinyl alcohol is commercially available, for example from Chang Chun Petrochemical Co., Ltd., Taipai, Taiwan under the B grades name including but not limited to, BF-24, BF-20, BF-17, BF-08, BF-05, BP-24, BP-20, BP-17, BP-08 and BP-05.

Preferably, water-soluble sheet may comprise from about 10 wt % to about 50 wt % PVA, preferably from about 15 wt % to about 40 wt %, having an average molecular weight ranging from about 80,000 to about 150,000 Daltons and a degree of hydrolysis ranging from about 80% to about 90%.

The BP-05 and BP-17 grades of PVA used in this example are stated to be partially hydrolyzed and have the following specifications:

| Grade | Viscosity (cps) | Hydrolysis (mole %) | Volatile (wt %) | Ash (wt %) | pH |
|---|---|---|---|---|---|
| BP-05 | 5-6 | 86-89 | <5 | <0.5 | 5-7 |
| BP-17 | 21-26 | 86-89 | <5 | <0.5 | 5-7 |

As used herein, the term "starch" includes both naturally occurring and modified starches. Typical natural sources for starches can include cereals, tubers, roots, legumes and fruits. Natural starches can be modified by any modification method known in the art to form modified starches, including physically modified starches, such as sheared starches or thermally-inhibited starches, chemically modified starches and pregelatinized starches. Suitable starches also include those available from Ingredion Incorporated (Westchester, Illinois, U.S.A.) under the brand name CASCO™. Preferably, the starch may be selected from corn and pea starches, including chemically modified corn starch available from Ingredion Incorporated under the brand name Hi-Maize™.

Other water-soluble polymers may include, but are not limited to, synthetic polymers including polycarboxylic acids, polyvinyl acetates, polyesters, polyamides, copolymers of methylvinyl ether and of maleic anhydride, copolymers of vinyl acetate; naturally sourced polymers including those of plant origin examples of which include alginates, and fruit extracts (pectins); and modified natural polymers including carboxymethylcellulose, and methylcellulose.

Surfactants

Embodiments of the water-soluble sheets of the present invention may comprise one or more surfactants suitable for hard surface cleaning. Example 1 above includes one or more of the surfactants lauramine oxide and cocamidopropyl betaine, for example. Example 2 on the other hand includes one or more of lauramine oxide, cocamidopropyl betaine, polyalkyl glucoside and glycereth cocoate, as another example.

In at least one embodiment of the present invention, a lathering water-soluble sheet suitable for use as a hard surface cleaner comprises from about 10 wt % to about 50 wt % of a surfactant. In such case, the final mixture may comprise from about 5 wt % to about 30 wt % of the surfactant.

Suitable surfactants include anionic surfactants, nonionic surfactants, cationic surfactants, zwitterionic surfactants, amphoteric surfactants, polymeric surfactants, and combinations thereof. Preferred surfactants include those having hydrophobic chains containing from 8 to 18 carbon atoms.

Non-limiting examples of suitable anionic surfactants include alkyl sulfates, alkyl ether sulfates, sulfated monoglycerides, sulfonated olefins, secondary alkane sulfonates, sulfonated methyl esters, sulfonated fatty acids, sodium lauryl glutamate, and combinations thereof. A preferred anionic surfactant includes alpha olefin sulfonates available from Stepan Company (Northfield, Illinois, U.S.A.) under the brand name BIO-TERGE™.

Non-limiting examples of suitable amphoteric surfactants include those that are broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group, e.g., carboxy, sulfate, phosphate, sulfonate or phosphonate. Preferred amphoteric surfactants include sodium 3-dodecylaminopropionate, sodium 3-dodecylaminopropane sulfonate, sodium lauryl sarcosinate, and mixtures thereof.

Non-limiting examples of zwitterionic surfactants include derivatives of aliphatic quaternary ammonium, phosphonium, and sulfonium compounds (e.g., carboxy, sulfonate, sulfate, phosphate, or phosphonate); betaines, including high alkyl betaines such as coco dimethyl carboxymethyl betaine, cocoamidopropyl betaine, cocobetaine, lauryl amidopropyl betaine, oleyl betaine, and lauryl dimethyl carboxymethyl betaine; and members of the family of amineoxides (e.g. dodecyldimethylamine oxide, and the like).

Preferred zwitterionic surfactants include cocoamidopropyl betaine available from Stepan Company (Northfield, Illinois, U.S.A.) under the brand name Armphosol™, and lauramide oxide also available from Stepan Company (Northfield, Illinois, U.S.A.) under the brand name Ammonyx™.

Non-limiting examples of nonionic surfactants include alkyl polyglucosides, propylene glycol esters of alkanoic acids, polyoxyethylenated alkyl phenols, polyoxyethylenated alcohols, glyceryl esters of alkanoic acids, polyglyceryl esters of alkanoic acids, sorbitol esters of alkanoic acids, and polyoxyethylenated silicones.

Non-limiting examples of polymeric surfactants include modified polycarboxylate, block copolymers of ethylene oxide and fatty alkyl residues, and propylene oxide, hydrophobically modified polyacrylates, hydrophobically modified cellulases, silicone polyethers, Vinylpyrrolidone/Vinylimidazole copolymer, silicone copolyol esters, diquaternary polydimethylsiloxanes, and co-modified amino/polyether silicones. Preferred polymeric surfactants include vinylpyrrolidone copolymers available from BASF SE (Rhein, Germany) under the brand name Sokalan™.

Plasticizers

Embodiments of the water-soluble sheets of the present invention may comprise a plasticizer in an amount ranging from about 1 wt % to about 65 wt %, most preferably from about 5 wt % to about 25 wt %. In such case, the final mixture may comprise from about 0.1 wt % to about 40 wt % of plasticizers, most preferably from about 3 wt % to about 15 wt %.

Non-limiting examples of suitable plasticizers include polyols, copolyols, polycarboxylic acids, dimethicone copolyols, and the like. Examples of useful polyols include, but are not limited to, glycerin, diglycerin, ethylene glycol, polyethylene glycol, propylene glycol, glycerol derivatives (such as propoxylated glycerol), and sugar alcohols (such as sorbitol). Preferred plasticizers include glycerin, ethylene glycol, polyethyleneglycol, propylene glycol, and mixtures thereof. The most preferred plasticizer is glycerin.

Biocides

Embodiments of the water-soluble sheets of the present invention may comprise a biocide, in an amount ranging from about 0.1 wt % to about 30 wt %, preferably from about 1 wt % to about 25 wt %. In such case, the final mixture may comprise from about 1.5 wt % to about 20 wt % of biocides, preferably from about 1.75 wt % to about 18 wt %.

Non-limiting examples of suitable biocides include derivatives of quaternary ammonium compounds e.g., alkyl dimethyl ethyl benzyl ammonium chloride, alkyl dimethyl-3,4-dichlorobenzyl ammonium chloride, alkyl dimethyl benzyl ammonium chloride, cetyl dimethyl benzyl ammonium chloride, chloride didecyl dimethylammonium, chloride dioctyl dimethylammonium, hexadecyl dimethyl benzyl ammonium chloride, methyl dodecyl benzyl trimethyl ammonium chloride, octa decyl dimethyl benzyl ammonium chloride, octyl decyl dimethyl ammonium chloride, and octyl dimethyl ammonium chloride; and phenolic compounds (e.g., chloro-ortho-phenylphenol, chlorophenol, clorophene, orthoxenol, paraxenol, and para-tert-amylphenol).

Additional Ingredients

Additionally, embodiments of the water-soluble sheets of the present invention may optionally include chelating agents, in an amount ranging from 0 wt % to 10 wt %. In such case, the final mixture may comprise from about 0 wt % to about 5 wt % of chelating agents.

Non-limiting example of suitable chelating agents include ethylene diamine N,N'-disuccinic acid, alkali metal, alkaline earth, ammonium, substitutes of ammonium, salts thereof, and mixtures thereof; salicylic acid, aspartic acid, glutamic acid, glycine, malonic acid, and mixtures thereof. A preferred chelating agent is N,N-Dicarboxymethyl glutamic acid tetrasodium salt (GLDA) available from Akzo Nobel Chemicals Ltd. (Ontario, Canada), under the brand name Dissolvine™ GL-47-S.

Embodiments of the water-soluble sheets of the present invention may also optionally include radical scavengers, in an amount ranging from 0 wt % to 10 wt %, preferably from 0.01 wt % to 1 wt %. In such case, the final mixture may comprise from about 0 wt % to about 0.5 wt % of radical scavengers, preferably from about 0.15 wt % to about 0.35 wt %.

Non-limiting examples of suitable radical scavengers include mono and dihydroxy benzenes and their analogs, and mixtures thereof; di-tert-butyl hydroxy toluene (BHT), hydroquinone, di-tert-butyl hydroquinone, mono-tert-butyl hydroquinone, tert-butyl-hydroxy anysole, benzoic acid, toluic acid, and catechol or mixtures thereof; and di-tert-butyl hydroxy toluene.

Embodiments of the water-soluble sheets of the present invention may also optionally include perfumes or fragrances, in an amount ranging from 0 wt % to 5.0 wt %, preferably from 0.1 wt % to 1.5 wt %. In such case, the final mixture may comprise from about 0 wt % to about 1 wt % of fragrances, preferably from about 0.1 wt % to about 0.5 wt %.

The function of the perfumes and fragrances is to add or improve the scent of the water-soluble sheet, for example to provide an olfactory pleasing aspect to the water-soluble sheet. However, it is also contemplated that the perfumes and fragrances may be used to add a scent to the hard surface cleaner solution prepared by dissolving the water-soluble sheet in a volume of water. Furthermore, the scent from the hard surface cleaner solution may be transferred temporarily to the hard surfaces cleaned therewith to scent the hard surfaces that lasts for a period following cleaning.

Embodiments of the water-soluble sheets of the present invention may also optionally include a dye, in an amount ranging from 0.1 wt % to 0.3 wt %. The function of the dye is to colour the water-soluble sheet, for example to provide an aesthetically pleasing appearance to the water-soluble sheet and/or the hard surface cleaner solution prepared by dissolving the water-soluble sheet in a volume of water. Accordingly, it is contemplated that the dye, when present, may comprise a single dye, or a combination of dyes.

Example 1—Water-Soluble Sheet for Use as a Hard Surface Cleaner/Disinfectant

The following describes steps for making an active composition delivery system comprising a water-soluble sheet for delivering a hard surface cleaner with biocide, primarily for in-home or consumer use, Good results have been obtained with this method to produce sheets which can be dissolved in water and then sprayed on hard surfaces to clean and disinfect them.

A first concentrated stock solution containing polyvinyl alcohol (PVA) is made by mixing the following ingredients in the indicated amounts:

| Ingredients | Function | Weight (kg) | Wt % |
|---|---|---|---|
| polyvinyl alcohol (PVA) BP-05 | biodegradable supporting matrix | 0.594 | 1.98% |
| polyvinyl alcohol (PVA) BP-17 | biodegradable supporting matrix | 5.343 | 17.81% |
| potassium sorbate | food-grade preservative | 0.015 | 0.05% |
| glycerin | improve texture of sheets | 1.485 | 4.95% |
| water | | 22.563 | 75.21% |

A second concentrated stock solution is made by mixing the following ingredients in the indicated amounts:

| Ingredients | Function | Weight (kg) | Wt % |
|---|---|---|---|
| lauramine oxide | amphoteric secondary surfactant with high foaming power | 10 | 40.00% |

-continued

| Ingredients | Function | Weight (kg) | Wt % |
|---|---|---|---|
| cocamidopropyl betaine | amphoteric surfactant, thickener and foam booster co-surfactant | 10 | 40.00% |
| potassium sorbate | food-grade preservative | 0.25 | 1.00% |
| water | | 4.75 | 19.00% |

A final mixture is made by mixing the following ingredients in the indicated amounts, which is enough to make five thousand 4 inch×5 inch water-soluble hard-surface disinfectant sheets:

| Ingredients | Function | Wt % |
|---|---|---|
| the first concentrated stock solution | | 40.81% |
| starch powder | plant-derived biodegradability booster | 20.40% |
| the second concentrated stock solution | | 34.0% |
| benzalkonium chloride | cationic surfactant used as biocide | 1.77% |
| mineral oil | improve texture of sheets | 1.63% |
| food colour (optional) | colour agent | 0.10% |
| fragrance (optional) | fragrance | 0.07% |
| glycerin | improve texture of sheets | 1.22% |

When preparing the final mixture, the first concentrated stock solution is preferably mixed first with the starch powder for 1 minute. Then the second concentrated stock solution is added to the mixture, followed by the remaining ingredients. The final mixture is mixed for 45 minutes. Preferably the final mixture will have a viscosity 40,000 cp at 20° C.

Next the final mixture may be applied to a surface, dried into a sheet, and cut to produce 4 inch×5 inch square sheets, having an average thickness of 0.9 mm and an average weight of 4 grams, which represent one dose of hard surface disinfectant including biocide. In this regard, an apparatus such as the apparatus for making a laundry detergent sheet disclosed in U.S. Pat. No. 9,464,264 may be used to dry the final mixture in the form of a sheet, and cut it to size the desired dimensions.

Preferably, the final mixture is aerated in a feeder before being applied onto a heated rotatable cylinder of the type described in U.S. Pat. No. 9,464,264. The outer surface of the heated rotatable cylinder is preferably heated to a temperature of about 100° C., which has been found to dry the aerated final mixture in approximately 10-15 minutes.

Aeration is preferably accomplished by mixing the final mixture with mechanical beaters at a surface level, while mixing, which tends to incorporate the entrained air throughout the final mixture. Since the aeration step is performed while mixing, it can last for the duration of the mixing step (i.e. 45 minutes).

Although including an aeration step is preferred, it will be appreciated that the aeration step is optional, and may be omitted in embodiments of the present invention. It has been found that including the aeration step increases the solubility of the water-soluble sheet in water, thereby increasing the dissolution rate of the water-soluble sheet, as compared to a water-soluble sheet prepared without aeration. An increased dissolution rate is desirable in embodiments of the water-soluble sheet which are intended to be dissolved in a volume of water by a user for use as a hard surface cleaner/disinfectant, since it results in a reduced preparation time.

The thickness of the resulting water-soluble sheet is controlled by modulating the viscosity of the aerated final mixture (for example by controlling the solids content in the final mixture) and the rotating speed and the surface temperature of the heated rotatable cylinder. As the aerated final mixture dries on the surface of the heated rotatable cylinder, it turns into a water-soluble sheet and can be picked up, either manually or peeled off the heated rotatable cylinder with a scraper.

The water-soluble sheet so formed presents two distinct sides; a bottom side, which is in direct contact with the surface of the heated rotatable cylinder, and an opposing top side, which is not in direct contact with the surface of the heated rotatable cylinder.

The resulting dry, water-soluble sheet is also characterized in that the bottom side is generally less dense, and has numerous, evenly sized pores, as compared to the top side, which is generally more dense, and has fewer, relatively larger pores. Without being bound to a particular theory, it is believed that these characteristic differences between the top and bottom sides of the water-soluble sheets made according to this method are due to the temperature gradient formed across the thickness of the final mixture due to contact with the heated rotatable cylinder. The density and pore sizes directly affect the rate of dissolution of the water-soluble sheets. Water-soluble sheets that are less dense and present larger pore sizes dissolve quicker, as compared to water-soluble sheets that are more dense and present smaller pore sizes, for example. Additionally, the temperature gradient can affect the surface texture of the water-soluble sheets. A side of the water-soluble sheet presenting fewer, but larger sized pores will feel more rough, as compared to a side presenting a greater number of smaller sized pores, for example. Good results have been obtained by applying an aerated final mixture at a temperature of 25° C. to the heated rotatable cylinder with a surface temperature of 80° C.

Each 4 inch×5 inch square water-soluble sheet produced according to this example would have the following substances, in substantially the following amounts:

| Ingredients | Function | Content in Sheet (wt %) |
|---|---|---|
| Ammonyx ™ LO | lauramine oxide | 8.64% |
| Amphosol ™ CG | cocoamido propyl betaine | 10.94% |
| food color (optional) | | 0.20% |
| fragrance (optional) | | 0.14% |
| glycerin (additive) | 1,2,3 propanetriol | 6.80% |
| mineral oil | white mineral oil (petroleum) | 3.39% |
| polyvinyl alcohol (PVA) BP-05 | acetic acid ethenyl ester, polymer with ethenol | 1.62% |
| polyvinyl alcohol (PVA) BP-17 | acetic acid ethenyl ester, polymer with ethenol | 14.62% |
| potassium sorbate | | 0.76% |
| starch | | 41.90% |
| StarQuat ™ T-85 | benzalkonium chloride | 2.99% |
| water | | 8% |

Although the above-described method preferably uses a first concentrated stock solution and a second concentrated stock solution to make a final mixture which is then applied to a surface, dried into a sheet, and cut to produce smaller square sheets containing biocide, it is contemplated that the final mixture may be made directly, without first making the first and second concentrated stock solutions.

Good disinfecting results were obtained by mixing 4 g of the water-soluble sheet prepared according to Example 1 into 250 mL of water, and allowing the resulting solution containing about 480 ppm of benzalkonium chloride to contact the hard surface to be disinfected for a period of about 10 minutes, assuming that the hard surface is not heavily soiled or that the hard surface had a pre-cleaning step.

An evaluation of the cleaning performance of a water-soluble sheet prepared according to the above-described method was carried using the test method ASTM D4488-95-A5. A cleaning solution was created utilizing 3.84 g of the water-soluble sheet prepared by the method described in Example 1 into 250 mL of the water. The testing method consisted of soiling and aging white vinyl tiles, then wiping the soiled and aged tiles with the cleaning solution, and then measuring the reflectance of the cleaned tiles with a colorimeter.

The white tiles were soiled by applying 0.05 grams of a prepared particulate and oily soil onto their centers and then evenly covering them with the dirt by rubbing a wet paper towel over the soil using a circular motion. The soiled tiles were then allowed to air-dry for 24 hours before applying the cleaning solution and wiping.

The colorimeter was calibrated to show a black and white scale where 0 represented the color black and 100 corresponded to the color white. The reflectance of vinyl tiles was measured before and after wiping with the cleaning solution by taking the average of five readings.

The cleaning efficiency of the cleaning solution was obtained by dividing the difference between the reflectance of the cleaned tiles over the reflectance of the soiled tiles. The cleaning solution showed an average percentage of cleaning efficiency of 97.6%.

Example 2—Water-Soluble Sheet for Use as a Hard Surface Cleaner/Disinfectant

The following describes steps for making an active composition delivery system comprising a water-soluble sheet for delivering a hard surface cleaner with biocide, primarily for industrial or commercial use. Good results have been obtained with this method to produce sheets which can be dissolved in water and then sprayed on hard surfaces to clean and disinfect them.

A first concentrated stock solution containing polyvinyl alcohol (PVA) is made by mixing the following ingredients in the indicated amounts:

| Ingredients | Function | Weight (kg) | Wt % |
|---|---|---|---|
| polyvinyl alcohol (PVA) BP-05 | biodegradable supporting matrix | 0.792 | 1.98% |
| polyvinyl alcohol (PVA) BP-17 | biodegradable supporting matrix | 7.124 | 17.81% |
| potassium sorbate | food-grade preservative | 0.02 | 0.05% |
| glycerin | improve texture of sheets | 1.98 | 4.95% |
| water | | 30.084 | 75.21% |

A second concentrated stock solution is made by mixing the following ingredients in the indicated amounts:

| Ingredients | Function | Weight (kg) | Wt % |
|---|---|---|---|
| lauramine oxide | amphoteric secondary surfactant with high foaming power | 0.46 | 11.50% |

-continued

| Ingredients | Function | Weight (kg) | Wt % |
|---|---|---|---|
| cocamidopropyl betaine | amphoteric surfactant, thickener and foam booster co-surfactant | 0.44 | 11.00% |
| alkyl polyglucosides | surfactant | 0.34 | 8.50% |
| glycereth cocoate | non-ionic surfactant | 0.6 | 15.00% |
| sodium gluconate | food-grade preservative | 0.1 | 2.50% |
| potassium sorbate | food-grade preservative | 0.06 | 1.50% |
| water | | 2 | 50.00% |

A final mixture is made by mixing the following ingredients in the indicated amounts, which is enough to make ten thousand 2 inch×5 inch water-soluble hard surface disinfectant sheets:

| Ingredients | Function | Weight (kg) | Wt % |
|---|---|---|---|
| first concentrated stock solution | | 40.00 | 55.23% |
| starch powder | plant-derived biodegradability booster | 13.00 | 17.95% |
| second concentrated stock solution | | 4.00 | 5.52% |
| benzalkonium chloride | cationic surfactant used as biocide | 13.00 | 17.95% |
| mineral oil | improve texture of sheets | 1.40 | 1.93% |
| fragrance (optional) | scent | | 0.18% |
| glycerin | improve texture of sheets | 0.92 | 1.24% |

When preparing the final mixture, the first concentrated stock solution is preferably mixed first with the starch powder for 1 minute. Then the second concentrated stock solution is added to the mixture, followed by the remaining ingredients. The final mixture is mixed for 45 minutes. Preferably the final mixture will have a viscosity 40,000 cp at 20° C.

Next the final mixture may be applied to a surface, dried into a sheet, and cut to produce 2×5 inch square sheets, having an average thickness of 0.9 mm and an average weight of 2 grams, which represent one dose of hard surface disinfectant including biocide. In this regard, an apparatus such as the apparatus for making a laundry detergent sheet disclosed in U.S. Pat. No. 9,464,264 may be used to dry the final mixture in the form of a sheet, and cut it to size the desired dimensions.

Each 2 inch×5 inch square water-soluble hard surface disinfectant sheet produced according to this example would have the following substances, in substantially the following amounts:

| Ingredient | Chemical Name | Percentage |
|---|---|---|
| Ammonyx ™ LO | lauramine oxide | 0.34% |
| Amphosol ™ CG | cocoamidopropyl betaine | 0.41% |
| food coloring - regular green (optional) | | 0.17% |
| fragrance (optional) | | 0.12% |
| Glucopon ™ 425 n | polyalkyl glucoside | 2.23% |
| glycerin | 1,2,3 propanetriol | 7.06% |
| Levenol ™ F200 | glycereth cocoate | 0.56% |
| mineral oil | | 3.40% |
| polyvinyl alcohol (PVA) BP-05 | | 1.86% |

-continued

| Ingredient | Chemical Name | Percentage |
|---|---|---|
| polyvinyl alcohol (PVA) BP-17 | | 16.77% |
| potassium sorbate | | 0.19% |
| sodium gluconate | | 0.25% |
| starch | | 31.24% |
| StarQuat ™ T-85 | benzalkonium chloride | 27.38% |
| water | | 8.00% |

Although the above-described method preferably uses a first concentrated stock solution and a second concentrated stock solution to make a final mixture which is then applied to a surface, dried into a sheet, and cut to produce smaller square sheets containing biocide, it is contemplated that the final mixture may be made directly, without first making the first and second concentrated stock solutions.

In the above-noted examples, the biocide active composition is benzalkonium chloride, a quaternary ammonium compound. It will be appreciated that, though less preferred, other quaternary ammonium compounds may be employed as the biocide, and other biocides may also be employed that are not quaternary ammonium compounds.

Good disinfecting results were obtained by mixing 2 g of the water-soluble sheet prepared according to Example 2 into 1000 mL of water, and allowing the resulting solution containing about 548 ppm of benzalkonium chloride to contact the hard surface to be disinfected for a period of about 10 minutes, assuming that the hard surface is not heavily soiled or that the hard surface had a pre-cleaning step.

As explained above, the Example 1 sheet is intended primarily for in home or consumer use (IHU), while the Example 2 sheet is intended for industrial or commercial use (IU). The IU sheet will typically be comprised of a substantially larger percentage of the biocide active composition—in the case of Example 2, around 25%. By contrast, the IHU sheet is comprised of a substantially lower percentage of the biocide active composition—in the case of Example 1, around 3%. The IHU sheet has a lower concentration of biocide for reasons of safety, associated with the toxicity of the biocide.

Benzalkonium chloride is a cationic surfactant. If mixed with anionic surfactants (e.g. alpha olefin sulphonate), the surfactants would come out of solution (i.e. precipitate), thus rendering them ineffective and preventing effective manufacture of the sheet. Thus, for example, the Example 1 and 2 sheets described above were formulated to exclude anionic surfactants.

In Example 2 described above, lauramine oxide and cocamidopropyl betaine (non-ionic surfactants) are used, together with non-ionic cosurfactants, namely, alkyl polyglucosides and glycereth cocoate. In testing the Example 2 formulation, it was found that these surfactants could effectively be mixed without precipitating out, if the starch is mixed with them prior to adding the benzalkonium chloride. If the benzalkonium chloride were mixed in sooner, these co-surfactants would precipitate. It is believed that the reason is that the pH of the mixture was high enough to cause precipitation, despite the cosurfactants being non-ionic. Mixing in the starch first results in a large amount of a high-molecular-weight substance being distributed throughout the mixture, which inhibits precipitation that might otherwise have occurred.

By contrast, in preparing the Example 1 formulation, it was found that the non-ionic cosurfactants alkyl polyglucosides and glycereth cocoate were precipitating, even with the starch being mixed in first. It is believed, based on testing, that the lower level of benzalkonium chloride (than in the IU formulation) is casually related to this precipitation. Therefore, the Example 1 formulation was formulated to exclude the non-ionic cosurfactants alkyl polyglucosides and glycereth cocoate.

It was found that a range of low concentrations of a cationic biocide surfactant, namely benzalkonium chloride, ranging from 0.1 wt % to 5 wt %, most preferably from 1.5 wt % to 3 wt %, allowed an anionic surfactant, namely alpha olefin sulfonate to also be present in the final mixture with the benzalkonium chloride. In other words, under these conditions, the cationic benzalkonium chloride did not interact with the alpha olefin sulfonate and precipitate out of the final mixture.

Accordingly, Example 3 below describes a method of making a water-soluble sheet for use as a hard surface cleaner with a cationic biocide surfactant, such as benzalkonium chloride, and an anionic surfactant, such as alpha olefin sulfonate, according to another embodiment of the present invention, in which the cationic benzalkonium chloride does not precipitate out of the final mixture. Moreover, no addition of starch was needed in the final mixture to avoid the undesired precipitation of benzalkonium chloride.

Preferably, this example water-soluble sheet may contain the following compounds:

- about 25 weight % to about 35 weight %, of a biodegradable supporting matrix, such as polyvinyl alcohol (PVA), preferably a combination of PVA BP-05 and PVA BP-17 (available from Chang Chun Petrochemical Co., Ltd., Taipei, Taiwan);
- about 0.1 weight % to about 1 weight %, of a food-grade preservative, which may comprise one or more of sodium gluconate and potassium sorbate;
- about 0.1 weight % to about 6 weight %, of a biocide, such as benzalkonium chloride;
- about 3 weight % to about 7 weight %, of a texture improver, such as glycerin;
- about 0.1 weight % to about 1 weight %, of a fragrance to provide scent enhancement;
- about 10 weight % to about 15 weight %, of an anionic surfactant such as alpha olefin sulfonate
- about 0.01 weight % to about 0.2 weight % of food colouring; and
- about 5 weight % to about 15 weight % surfactant/detergent ingredients, comprising one or more of lauramine oxide, cocamidopropyl betaine, polyalkyl glucoside and glycereth cocoate.

Example 3—Water-Soluble Sheet for Use as a Hard Surface Cleaner/Disinfectant

The following describes steps for making an active composition delivery system comprising a water-soluble sheet for delivering a hard surface cleaner with biocide, for home use, as well as industrial or commercial use. Good results have been obtained with this method to produce sheets which can be dissolved in water and then sprayed on hard surfaces to clean and disinfect them.

A first concentrated stock solution containing polyvinyl alcohol (PVA) is made by mixing the following ingredients in the indicated amounts

| Ingredients | Function | Weight (kg) | Wt % |
|---|---|---|---|
| polyvinyl alcohol (PVA) BP-05 | biodegradable supporting matrix | 0.792 | 1.98% |
| polyvinyl alcohol (PVA) BP-17 | biodegradable supporting matrix | 7.124 | 17.81% |
| potassium sorbate | food-grade preservative | 0.02 | 0.05% |
| glycerin | improve texture of sheets | 1.98 | 4.95% |
| water | | 30.084 | 75.21% |

A second concentrated stock solution is made by mixing the following ingredients in the indicated amounts:

| Ingredients | Function | Weight (kg) | Wt % |
|---|---|---|---|
| alpha olefin sulfonate | anionic surfactant | 4.8 | 40% |
| alkyl polyglucosides | surfactant | 1.32 | 11% |
| sodium gluconate | food-grade preservative | 0.3 | 2.50% |
| potassium sorbate | food-grade preservative | 0.18 | 1.50% |
| water | | 5.4 | 45.00% |

A final mixture is made by mixing the following ingredients in the indicated amounts, which is enough to make ten thousand 2 inch×5 inch water-soluble hard surface disinfectant sheets:

| Ingredients | Function | Weight (kg) | Wt % |
|---|---|---|---|
| first concentrated stock solution | | 40 | 72.33% |
| carboxymethyl cellulose | water dissolvable polymer | 1 | 1.81% |
| second concentrated stock solution | | 12 | 21.70% |
| benzalkonium chloride | cationic surfactant used as biocide | 1 | 1.81% |
| mineral oil | improve texture of sheets | 0.4 | 0.72% |
| fragrance (optional) | scent | | 0.00% |
| dye (optional) | yellow food color | | 0.00% |
| glycerin | improve texture of sheets | 0.9 | 1.63% |

When preparing the final mixture, the second concentrated stock solution is preferably added to the first concentrated stock solution, followed by the remaining ingredients. The final mixture is mixed for 45 minutes. Preferably the final mixture will have a viscosity 40,000 cp at 20° C.

Next the final mixture may be applied to a surface, dried into a sheet, and cut to produce 2×5 inch square sheets, having an average thickness of 0.9 mm and an average weight of 2 grams, which represent one dose of hard surface disinfectant including biocide. In this regard, an apparatus such as the apparatus for making a laundry detergent sheet disclosed in U.S. Pat. No. 9,464,264 may be used to dry the final mixture in the form of a sheet, and cut it to size the desired dimensions.

Each 2 inch×5 inch square water-soluble hard surface disinfectant sheet produced according to this example would have the following substances, in substantially the following amounts:

| Ingredient | Chemical Name | Percentage |
|---|---|---|
| carboxymethyl cellulose | carboxymethyl celluose | 5.81% |
| food color (optional) | food color | 0.00% |
| fragrance (optional) | fragrance | 0.00% |
| Glucopon ™ 425 N | alkyl polyglucoside | 3.87% |

-continued

| Ingredient | Chemical Name | Percentage |
|---|---|---|
| glycerin | glycerin | 16.74% |
| mineral oil | paraffinum liquidum | 2.30% |
| polyvinyl alcohol (PVA) B-05 | polyvinyl alcohol | 4.42% |
| polyvinyl alcohol (PVA) B-17 | polyvinyl alcohol | 39.73% |
| potassium sorbate | potassium sorbate | 1.16% |
| Quadrasurf™ AOS-40 SP HP | alpha olefin sulfonate | 11.52% |
| sodium gluconate | sodium gluconate | 1.74% |
| StarQuat ™ T-85 | benzalkonium chloride | 4.70% |
| water | aqua | 8% |

Although the above-described method preferably uses a first concentrated stock solution and a second concentrated stock solution to make a final mixture which is then applied to a surface, dried into a sheet, and cut to produce smaller square sheets containing biocide, it is contemplated that the final mixture may be made directly, without first making the first and second concentrated stock solutions.

The concentration of active cationic surfactant benzalkonium chloride in the water-soluble sheets made according to the above Example 3 was measured using High Pressure Liquid Chromatography (HPLC). HPLC was performed on samples of the water-soluble sheet dissolved in a volume of water. The presence of active benzalkonium chloride in the samples confirmed that there was no significant precipitation of benzalkonium chloride in the final mixture used to prepare the water-soluble sheet.

In the above-noted examples, the biocide active composition is benzalkonium chloride, a quaternary ammonium compound. It will be appreciated that, though less preferred, other quaternary ammonium compounds may be employed as the biocide, and other biocides may also be employed that are not quaternary ammonium compounds.

The hard surface disinfectant with biocide of the present invention may be used by dissolving the above-described sheet in a container, such as a bottle, spray bottle, pail or tub, and then using the disinfectant solution to disinfect the hard surface. The water may be placed in the container first, or the sheet first. The solution may be sprayed on to the hard surface and wiped for cleaning and disinfection. It may be mopped onto the hard surface to disinfect it. As another example, if it is desired to disinfect the interior of an industrial machine, the solution may be circulated into the machine to disinfect the interior surfaces thereof. As yet another example, if it is desired to disinfect the surfaces of an object, the object may be partially or completely submerged in the disinfectant solution to disinfect the object.

Preferably, the active composition delivery system 10 may be provided with instructions for use. For example, the instructions may relate to use of the active composition delivery system 10, as a hard surface cleaner and/or disinfectant.

Good disinfecting results were obtained by mixing 4 g of the water-soluble sheet prepared according to Example 3 into 250 mL of water, and allowing the resulting solution containing about 752 ppm of benzalkonium chloride to contact the hard surface to be disinfected for a period of about 10 minutes, assuming that the hard surface is not heavily soiled or that the hard surface had a pre-cleaning step.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

What is claimed is:

1. A water-soluble sheet for delivering a biocide composition to a volume of water, the water-soluble sheet comprising:
- about 14.5 wt % to about 20.5 wt % of a polyvinyl alcohol (PVA) having a weight average molecular weight ($M_w$) ranging from about 22,000 Daltons to about 150,000 Daltons, and a degree of hydrolysis on a mole percent basis ranging from about 80% to about 90%;
- about 28 wt % to about 46 wt % of a starch;
- about 2.7 wt % to about 30.1 wt % of a cationic biocide suitable for disinfecting;
- about 17 wt % to about 22 wt % of a surfactant suitable for hard surface cleaning, wherein the surfactant is not anionic;
- about 6 wt % to about 7.7 wt % of glycerin; and
- water sufficient to provide a water content of about 7.8 to about 8.2 wt %.

2. The water-soluble sheet of claim 1, wherein the PVA is a combination of a first grade and a second grade having the following properties:

| | Viscosity (cps) | Hydrolysis (mole %) | Volatile (wt %) | Ash (wt %) | pH |
|---|---|---|---|---|---|
| BP-05 | 5-6 | 86-89 | <5 | <0.5 | 5-7 |
| BP-17 | 21-26 | 86-89 | <5 | <0.5 | 5-7 |

3. The water-soluble sheet of claim 1, wherein the cationic biocide is a quaternary ammonium compound chosen from the group consisting of an alkyl dimethyl ethyl benzyl ammonium chloride, an alkyl dimethyl-3,4-dichlorobenzyl ammonium chloride, an alkyl dimethyl benzyl ammonium chloride, a cetyl dimethyl benzyl ammonium chloride, a chloride didecyl dimethylammonium, a chloride dioctyl dimethylammonium, a hexadecyl dimethyl benzyl ammonium chloride, a methyl dodecyl benzyl trimethyl ammonium chloride, an octa decyl dimethyl benzyl ammonium chloride, an octyl decyl dimethyl ammonium chloride, an octyl dimethyl ammonium chloride, and a combination thereof.

4. The water-soluble sheet of claim 1, wherein the surfactant comprises lauramine oxide, cocamidopropyl betaine, polyalkyl glucoside, glycereth cocoate, or a combination thereof.

5. The water-soluble sheet of claim 1, wherein dissolving the water-soluble sheet in the volume of water forms a solution useful as a disinfectant and a hard surface cleaner.

6. The water-soluble sheet of claim 1 comprising:
- about 14.5 wt % to about 18 wt % of the PVA;
- about 38 wt % to about 46 wt % of the starch;
- about 2.7 wt % to about 3.3 wt % of the cationic biocide, wherein the cationic biocide comprises benzalkonium chloride; and
- about 17 wt % to about 21 wt % of the surfactant, wherein the surfactant comprises lauramine oxide, cocamidopropyl betaine, or a combination thereof.

7. The water-soluble sheet as claimed in claim 6 further comprising about 0.68 wt % to about 0.84 wt %, of a food-grade preservative.

8. The water-soluble sheet as claimed in claim 6 further comprising at least one of:
- a) about 0.12 wt % to about 0.16 wt % of a fragrance; and
- b) about 0.18 wt % to about 0.22 wt % of a food coloring agent.

9. The water-soluble sheet of claim 1 comprising:
- about 16.5 wt % to about 20.5 wt % of the PVA;
- about 28 wt % to about 34 wt % of the starch;
- about 24.6 wt % to about 30.1 wt % of the cationic biocide, wherein the cationic biocide comprises benzalkonium chloride; and
- about 18 wt % to about 22 wt % of the surfactant, wherein the surfactant comprises lauramine oxide, cocamidopropyl betaine, polyalkyl glucoside, glycereth cocoate, or a combination thereof.

10. The water-soluble sheet as claimed in claim 9 further comprising about 0.4 wt % to about 0.5 wt %, of a food-grade preservative and at least one of:
- a) about 0.11 wt % to about 0.13 wt % of a fragrance; and
- b) about 0.15 wt % to about 0.19 wt % of a food coloring agent.

11. A water-soluble sheet for delivering a biocide composition to a volume of water, the water-soluble sheet comprising:
- about 25 wt % to about 35 wt % of a polyvinyl alcohol (PVA) having a weight average molecular weight ($M_w$) ranging from about 22,000 Daltons to about 150,000 Daltons, and a degree of hydrolysis on a mole percent basis ranging from about 80% to about 90%;
- about 0.1 wt % to about 6 wt % of a cationic biocide suitable for disinfecting;
- about 10 wt % to about 15 wt % of a first surfactant suitable for hard surface cleaning,
- wherein the first surfactant is anionic;
- about 5 wt % to about 15 wt % of a second surfactant suitable for hard surface cleaning, wherein the second surfactant is not anionic;
- about 3 wt % to about 7 wt % of glycerin; and
- water sufficient to provide a water content of about 8 percent.

12. The water-soluble sheet of claim 11, wherein the PVA is a combination of a first grade and a second grade having the following properties:

| | Viscosity (cps) | Hydrolysis (mole %) | Volatile (wt %) | Ash (wt %) | pH |
|---|---|---|---|---|---|
| BP-05 | 5-6 | 86-89 | <5 | <0.5 | 5-7 |
| BP-17 | 21-26 | 86-89 | <5 | <0.5 | 5-7 |

13. The water-soluble sheet of claim 11, wherein the cationic biocide is a quaternary ammonium compound chosen from the group consisting of an alkyl dimethyl ethyl benzyl ammonium chloride, an alkyl dimethyl-3,4-dichlorobenzyl ammonium chloride, an alkyl dimethyl benzyl ammonium chloride, a cetyl dimethyl benzyl ammonium chloride, a chloride didecyl dimethylammonium, a chloride dioctyl dimethylammonium, a hexadecyl dimethyl benzyl ammonium chloride, a methyl dodecyl benzyl trimethyl ammonium chloride, an octa decyl dimethyl benzyl ammonium chloride, an octyl decyl dimethyl ammonium chloride, an octyl dimethyl ammonium chloride, and a combination thereof.

14. The water-soluble sheet of claim 13, wherein the quaternary ammonium compound is benzalkonium chloride.

15. The water-soluble sheet as claimed in claim 11, wherein the first surfactant is alpha olefin sulfonate, an alkyl sulfate, an alkyl ether sulfate, a sulfated monoglyceride, a sulfonated olefin, a secondary alkane sulfonate, a sulfonated methyl ester, a sulfonated fatty acid, a sodium lauryl glutamate, or a combination thereof.

16. The water-soluble sheet as claimed in claim 11, wherein the second surfactant comprises lauramine oxide, cocamidopropyl betaine, polyalkyl glucoside, glycereth cocoate, or a combination thereof.

17. The water-soluble sheet as claimed in claim 11 further comprising about 0.1 wt % to about 1 wt %, of a food-grade preservative comprising sodium gluconate, potassium sorbate, or a combination thereof.

18. The water-soluble sheet as claimed in claim 11 further comprising at least one of:

a) about 0.1 wt % to about 1 wt % of a fragrance; and b) about 0.01 wt % to about 0.2 wt % of a food coloring agent.

19. The water-soluble sheet of claim 1, wherein the weight average molecular weight (Mw) of the polyvinyl alcohol (PVA) ranges from about 80,000 Daltons to about 150,000 Daltons.

20. The water-soluble sheet of claim 11, wherein the weight average molecular weight (Mw) of the polyvinyl alcohol (PVA) ranges from about 80,000 Daltons to about 150,000 Daltons.

* * * * *